United States Patent
Kennedy

(10) Patent No.: US 11,781,666 B2
(45) Date of Patent: *Oct. 10, 2023

(54) CONTROL VALVE

(71) Applicant: Kennedy Valve Company, Elmira, NY (US)

(72) Inventor: Paul Kennedy, Horseheads, NY (US)

(73) Assignee: KENNEDY VALVE COMPANY, Elmira, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,798

(22) Filed: Nov. 10, 2022

(65) Prior Publication Data

US 2023/0078885 A1    Mar. 16, 2023

Related U.S. Application Data

(63) Continuation of application No. 17/217,536, filed on Mar. 30, 2021, now Pat. No. 11,519,516.

(51) Int. Cl.
*F16K 27/02* (2006.01)
*F16K 1/42* (2006.01)
*F16K 41/12* (2006.01)

(52) U.S. Cl.
CPC ............... *F16K 27/02* (2013.01); *F16K 1/42* (2013.01); *F16K 41/12* (2013.01)

(58) Field of Classification Search
CPC .................................. F16K 1/10; F16K 27/02
See application file for complete search history.

(56) References Cited

U.S. PATENT DOCUMENTS

| | | | | |
|---|---|---|---|---|
| 2,379,382 A | * | 6/1945 | Smolensky | F16K 27/02 251/142 |
| 2,504,057 A | * | 4/1950 | Trefil | F16K 41/12 74/18.2 |
| 2,915,087 A | * | 12/1959 | Kruschik | F16K 1/10 251/324 |
| 3,098,637 A | * | 7/1963 | Baustian | F16K 1/10 251/285 |
| 3,907,248 A | | 9/1975 | Coulbeck | |
| 4,009,865 A | * | 3/1977 | Davlin | F16K 1/10 251/366 |
| 4,166,607 A | * | 9/1979 | Webb | F16K 1/10 251/273 |
| 4,270,727 A | * | 6/1981 | Norman | F16K 1/10 251/63.4 |
| 5,078,174 A | * | 1/1992 | Grooms | E03F 1/007 137/236.1 |
| 5,082,238 A | * | 1/1992 | Grooms | E03F 1/006 137/236.1 |

(Continued)

*Primary Examiner* — Robert K Arundale
(74) *Attorney, Agent, or Firm* — Brown & Michaels, PC

(57) ABSTRACT

A control valve body has a flow passage including an inlet, an outlet, a first portion, and a second portion, the first portion having a first axis centered through the inlet, a first bend, and a second axis, the second portion having a third axis centered through the outlet, a second bend, and a fourth axis, the fourth axis perpendicular to the second axis. The first portion is to an upstream side of a junction of the first portion and the second portion, and the second portion is to a downstream side of the junction. The second axis is centered through the junction. An opening to the second portion has a fifth axis aligned with the second axis.

25 Claims, 8 Drawing Sheets

(56) References Cited

U.S. PATENT DOCUMENTS

| | | | |
|---|---|---|---|
| 5,280,872 A | | 1/1994 | Yamanaka |
| 5,392,807 A | | 2/1995 | Caudle et al. |
| 5,472,015 A | | 12/1995 | Chiou |
| 5,575,454 A | | 11/1996 | Ushitora et al. |
| 5,918,853 A | | 7/1999 | Yamabe et al. |
| 6,026,835 A | * | 2/2000 | Martin .................. F16K 41/106 251/118 |
| 8,469,337 B1 | * | 6/2013 | Hoeptner, III ............ F16K 1/36 251/284 |
| 8,826,933 B2 | * | 9/2014 | Roper ....................... F16K 1/52 251/282 |
| 11,353,114 B1 | * | 6/2022 | Kennedy ................... F16K 1/46 |
| 2002/0003222 A1 | * | 1/2002 | Fukano ............... F16K 31/1221 251/63.5 |
| 2002/0145123 A1 | * | 10/2002 | Kah, Jr. .................... F16K 1/10 251/30.01 |
| 2004/0036045 A1 | * | 2/2004 | Weingarten ............. F16K 41/12 251/61.5 |
| 2007/0057214 A1 | * | 3/2007 | Lutz ........................ F16K 51/02 251/63.5 |
| 2013/0240769 A1 | | 9/2013 | Rogalka et al. |
| 2014/0225020 A1 | * | 8/2014 | Adams .................... F16K 27/02 251/324 |
| 2015/0013790 A1 | * | 1/2015 | Hoff ........................ F16K 3/246 137/553 |
| 2017/0097107 A1 | * | 4/2017 | Hotz ........................ F16K 41/02 |
| 2022/0316615 A1 | * | 10/2022 | Kennedy ................. F16K 41/12 |

* cited by examiner

CONTROL VALVE

REFERENCE TO RELATED APPLICATIONS

This application is a continuation application of co-pending U.S. patent application Ser. No. 17/217,536, filed Mar. 30, 2021, titled "CONTROL VALVE". U.S. patent application Ser. No. 17/217,536 is incorporated herein by reference.

BACKGROUND OF THE INVENTION

Field of the Invention

The invention pertains to the field of valves. More particularly, the invention pertains to control valves with improved flow and flow rate.

A control valve is a valve used to control fluid flow by varying the size of a flow passage, enabling the direct control of flow rate and the consequential control of process quantities such as pressure, temperature, and fluid level. FIG. 1 illustrates a cross section of a conventional control valve 10. FIG. 2 shows an external perspective view of the conventional control valve 10. The control valve 10 includes a body 12, a flow passage 14 through the body 12, and a valve plug 16 to seal with a seat ring 18 and close the flow passage 14. The plug 16 is attached to a stem 20, which can move linearly along an axis of the stem to move the plug 16 between a closed position, where the plug 16 fills an opening through the seat ring 18, and an open position, where the plug 16 is moved out of the opening through the seat ring 18.

The body 12 has a first leg 22 with an inlet opening 23 and a second leg 24 with an outlet opening 25. The first leg 22 and the second leg 24 intersect at the seat ring 18. A plane of the seat ring 18 is parallel to an axis of either the inlet opening 23 of the first leg 22 or the outlet opening 25 of the second leg 24, and the stem 20 extends and moves perpendicularly to the plane of the seat ring 18 and the axis of either the inlet opening 23 of the first leg 22 or the outlet opening 25 of the second leg 24. In other words, an axis of the seat ring 18 is perpendicular to the inlet opening 23 and/or the outlet opening 25. A seat retainer 26 includes many support members 27 that extend from the seat ring 18 through the flow passage 14 at the second leg 24, and brace against another secure part of the control valve 10 to hold the seat ring 18 in position. The first leg 22 and the second leg 24 are round in shape near or around the seat ring 18.

During operation of the control valve 10, when the control valve 10 is open, fluid flows from the inlet opening 23, changing direction twice to get through the first leg 22 to the seat ring 18, where the fluid is redirected about 90 degrees through the seat ring 18. After traveling through the seat ring 18, the fluid is again redirected twice before passing through the outlet opening 25—first more than 90 degrees and then again reduce the net redirection to 90 degrees at the outlet opening 25. The sharp angles and total sum of angles at which the fluid is redirected causes turbulence and slows the flow rate. Further, the plurality of support members 27 of the seat retainer 26 obstruct flow, further exacerbating the turbulence and flow interruption.

SUMMARY OF THE INVENTION

A control valve is provided to reduce turbulence and to increase flow rate relative to conventional control valves. In an embodiment, a control valve includes a body, a valve seat, a stem, and a seal. The body has a flow passage therethrough, the flow passage having an inlet, an outlet, a first portion, and a second portion, the first portion having a first axis centered through the inlet, the second portion having a second axis centered through the outlet, the first axis parallel with the second axis. The valve seat is positioned at a junction between the first portion and the second portion, the first portion being to an upstream side of the valve seat and the second portion being to a downstream side of the valve seat, the valve seat having an opening therethrough. The stem has a third axis oriented to intersect with the opening of the valve seat. The seal is attached to the stem, the stem configured to move axially to move the seal between a closed position, where the seal fills the opening through the valve seat, and an open position, where the seal is distal from the valve seat.

In an embodiment, a control valve body includes a flow passage and an opening. The flow passage has an inlet, an outlet, a first portion, a second portion, and a junction of the first portion with the second portion, the first portion having a first axis centered through the inlet, a first bend, and a second axis, the second portion having a third axis centered through the outlet, a second bend, and a fourth axis, the fourth axis perpendicular to the second axis, the first portion being to an upstream side of the junction and the second portion being to a downstream side of the junction, the second axis centered through the junction. The opening is to the second portion. The opening has a fifth axis aligned with the second axis.

DETAILED DESCRIPTION OF THE INVENTION

Figure 1:
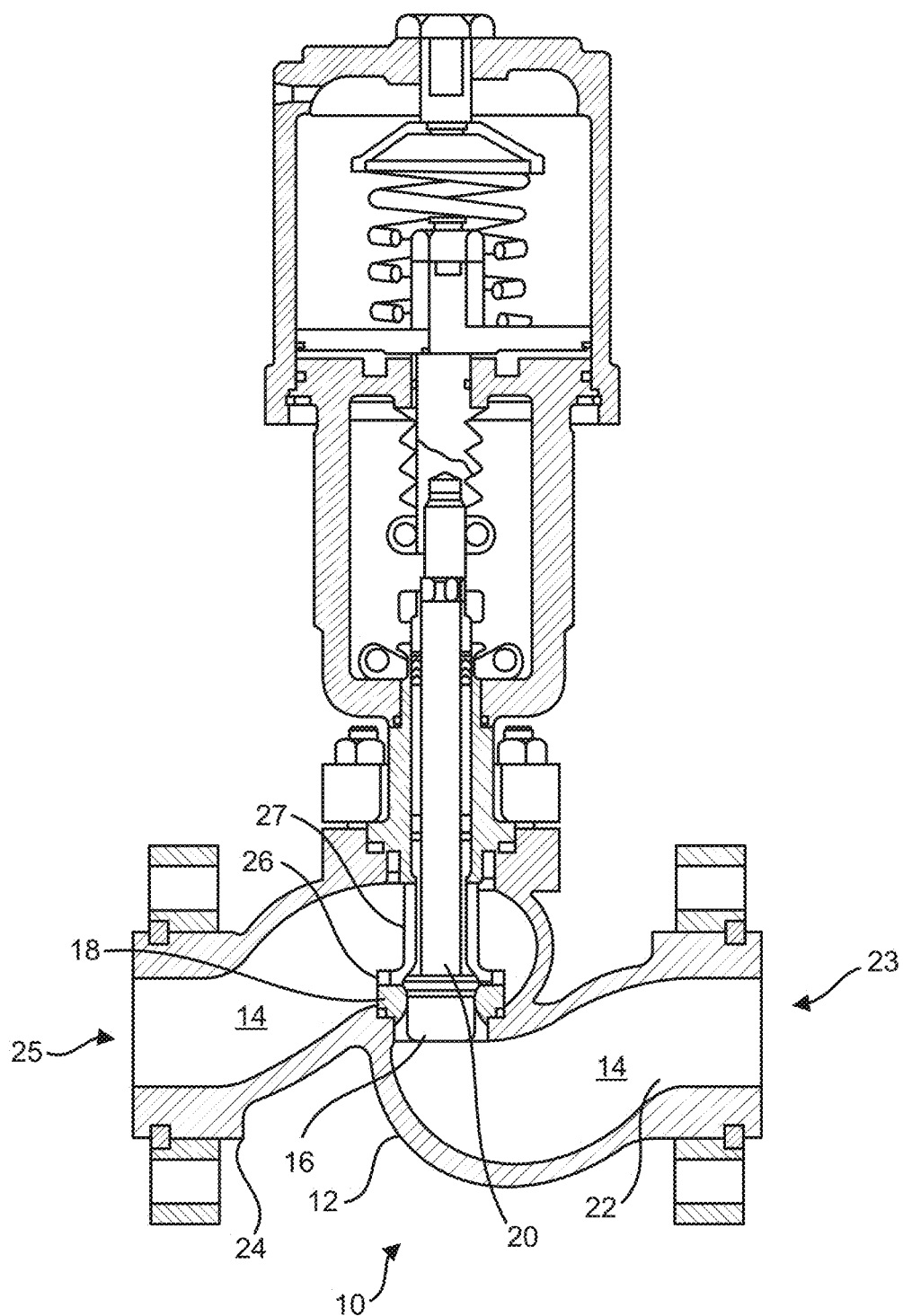
FIG. 1 illustrates a cross section of a conventional control valve.
Figure 2:
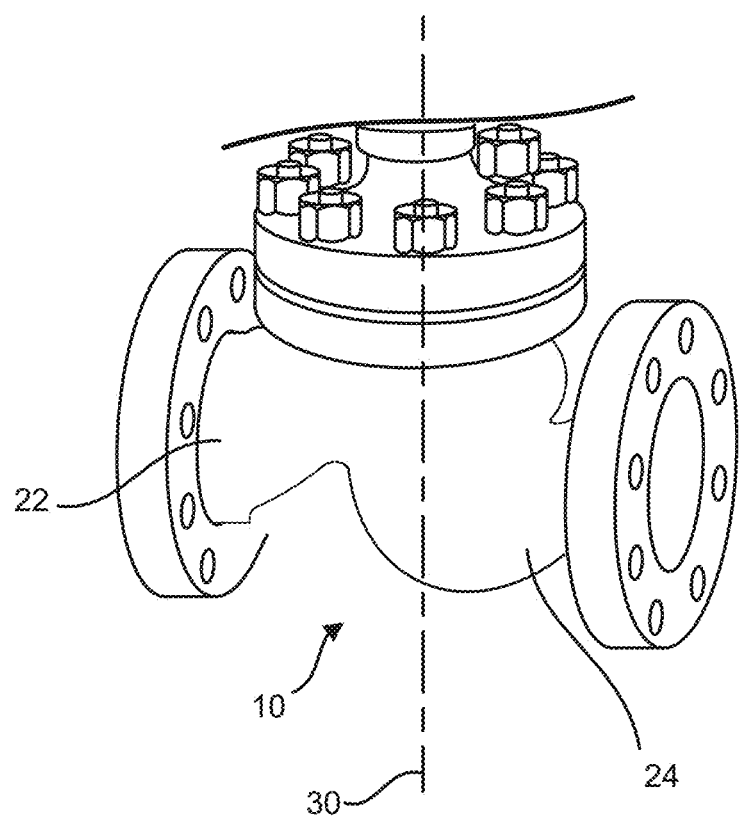
FIG. 2 shows a perspective view of a portion of the conventional control valve of FIG. 1.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "approximately" and "about", when qualifying a quantity, shall mean the quantity with a tolerance plus or minus 10 percent of the quantity, unless otherwise specified.

Figure 3:
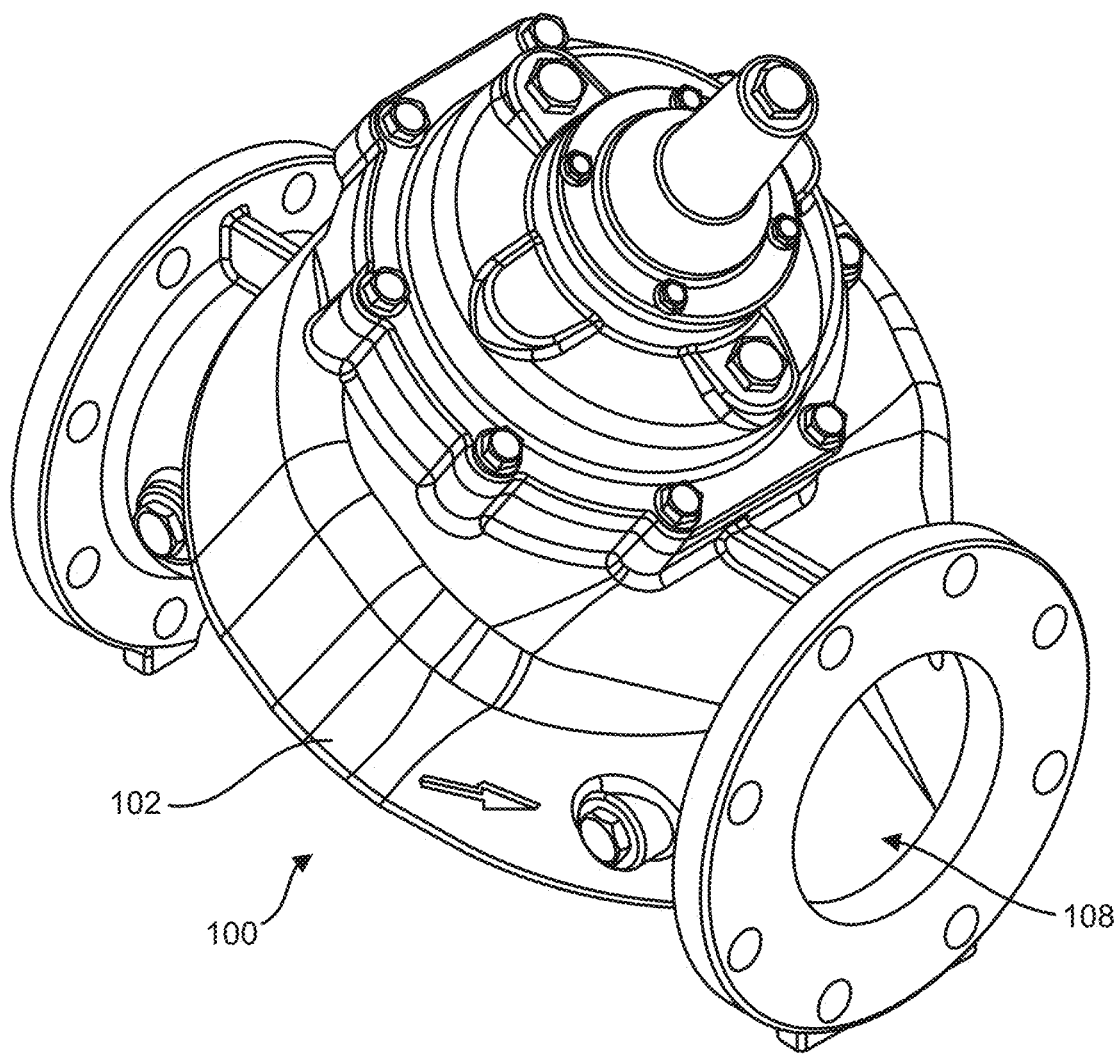
FIG. 3 illustrates a perspective view of a control valve, according to an embodiment of the invention.
Figure 4:
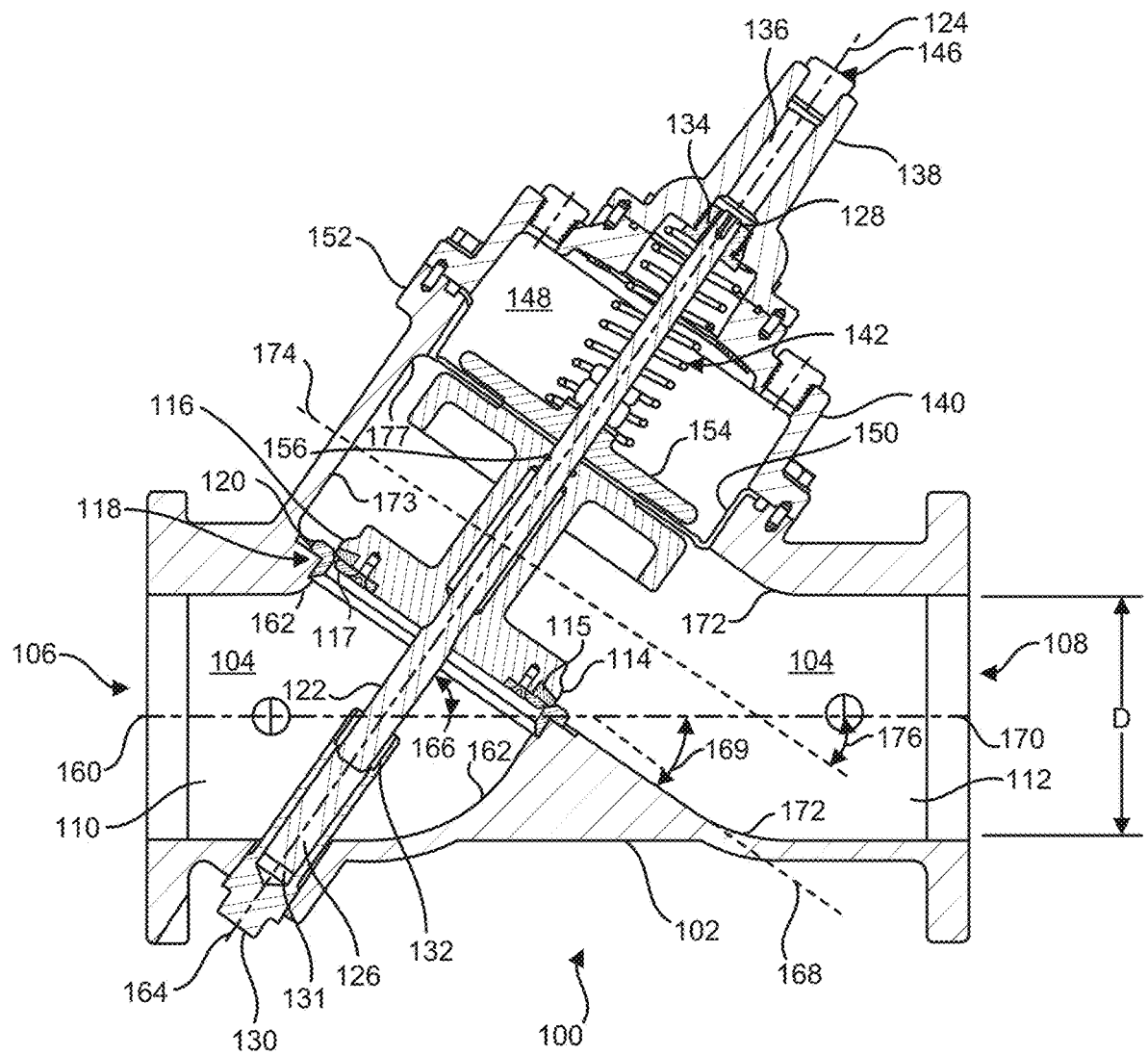
FIG. 4 illustrates a cross section of the control valve of FIG. 3, with the control valve in closed position.
Figure 5:
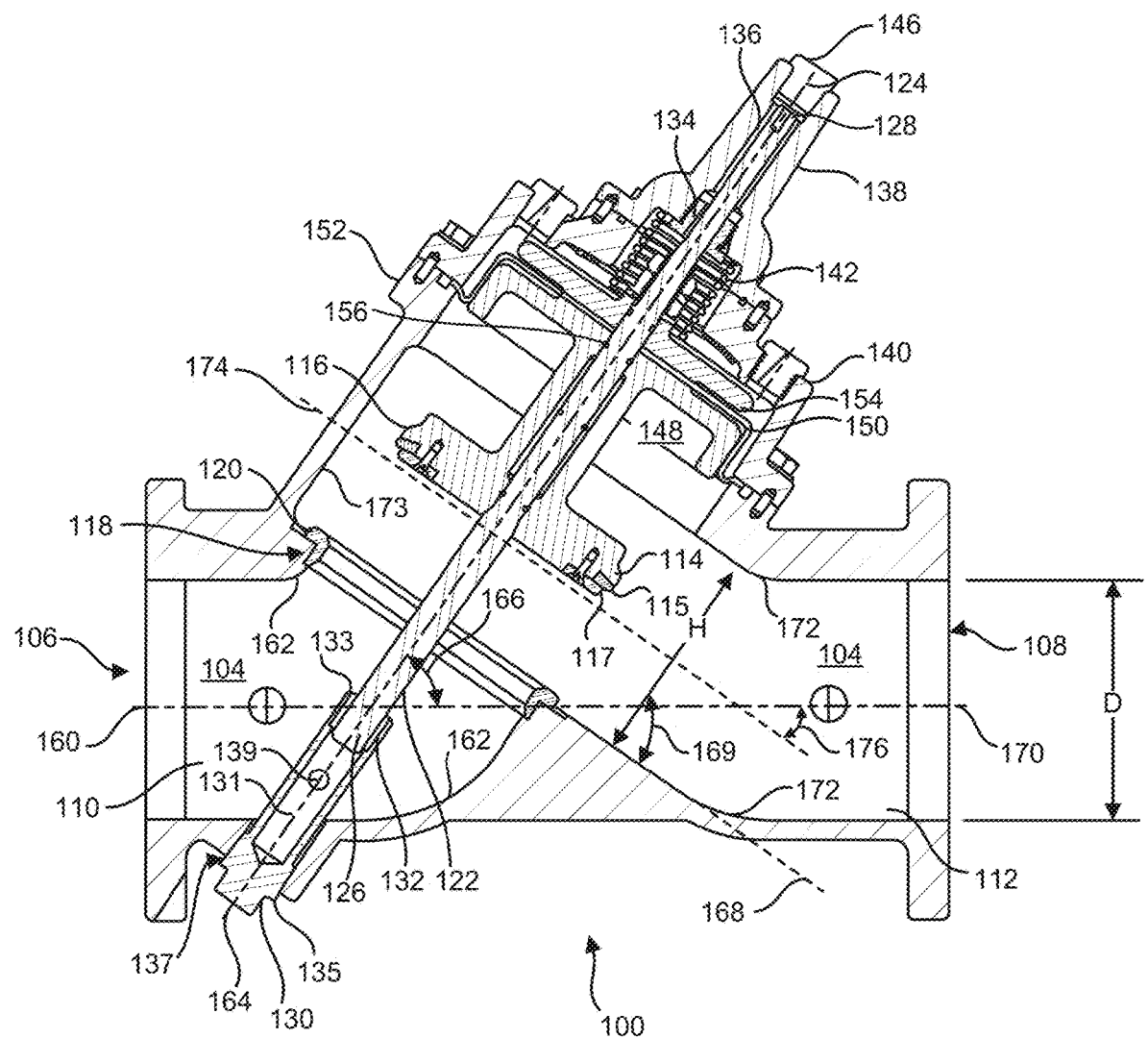
FIG. 5 illustrates a cross section of the control valve of FIG. 3, with the control valve in an open position.

A control valve is provided to reduce turbulence and to increase flow rate relative to conventional control valves. FIG. 3 illustrates a perspective view of a control valve 100, according to an embodiment of the invention. FIG. 4 and FIG. 5 illustrate a cross-section of the control valve 100 in a closed position and in an open position, respectively. According to FIGS. 3-5, the control valve 100 includes a body 102 having a flow passage 104 through which fluid flows. The flow passage 104 has an inlet 106, an outlet 108, a first portion 110, and a second portion 112. Fluid, such as but not limited to water, can enter the flow passage 104 at the inlet 106, flow through the first portion 110, to the second portion 112, and out the outlet 108.

A valve seal 116 is positioned at a junction 118 of the first portion 110 and the second portion 112 to control fluid flowing through the flow passage 104. The first portion 110 is to an upstream side of the junction 118 and the second portion 112 is to a downstream side of the junction 118. In the illustrated embodiment, the valve seal 116 is a disk 114 with a seal ring 115 held between the disk 114 and a retainer ring 117 fastened to the disk 114. The seal ring 115 extends around a periphery or circumference of the disk 114, though the valve seal 116 could be a plug or have other shapes. The valve seal 116 can be moved into and out of the junction 118, to close the flow passage 104 at the junction 118 (see FIG. 4), or to open the flow passage 104 at the junction 118 (see FIG. 5).

In the closed position of FIG. 4, the valve seal 116 fills an opening of a valve seat 120, with the seal ring 115 contacting and sealing against the valve seat 120, which, in turn, contacts and seals against the body 102 of the control valve 100 at the junction 118, such that in the closed position, the body 102, the valve seat 120, and the valve seal 116 form a fluid tight barrier to prevent fluid from flowing through the junction 118. To form the fluid-tight connection with the body 102, the valve seat 120 is shaped congruently with the inner surface of the body 102 at the junction 118. In the illustrated embodiment, this shape of the valve seat 120 is that of a ring. Bolts, screws, or other fasteners (not shown) can secure the valve seat 120 to the body 102 of the control valve 100. Notably, the valve seat 120 is attached securely to the body 102 at the junction 118 without support members or other elements projecting from the ring through the flow passage 104 to another portion or component of the control valve 100. This absence of flow-obstructing elements facilitates an increased flow rate and a decreased turbulence relative to conventional control valves.

In the open position, as illustrated in FIG. 5, the valve seal 116 is moved to a location distal from the valve seat 120, which allows fluid to flow through the junction 118. The valve seal 116 can be moved to any location between the closed position and the open position to control the flow rate.

The valve seal 116 is attached to a stem 122 and is moved between the closed position and the open position along with, and guided by, the stem 122. The axis 124 of the stem 122 is oriented to intersect with the junction 118 and the opening through the valve seat 120. The stem 122, and hence the valve seal 116, are restricted to move along an axis 124 of the stem 122 by mechanisms at a first end 126 and a second end 128 of the stem 122.

Figure 5A:
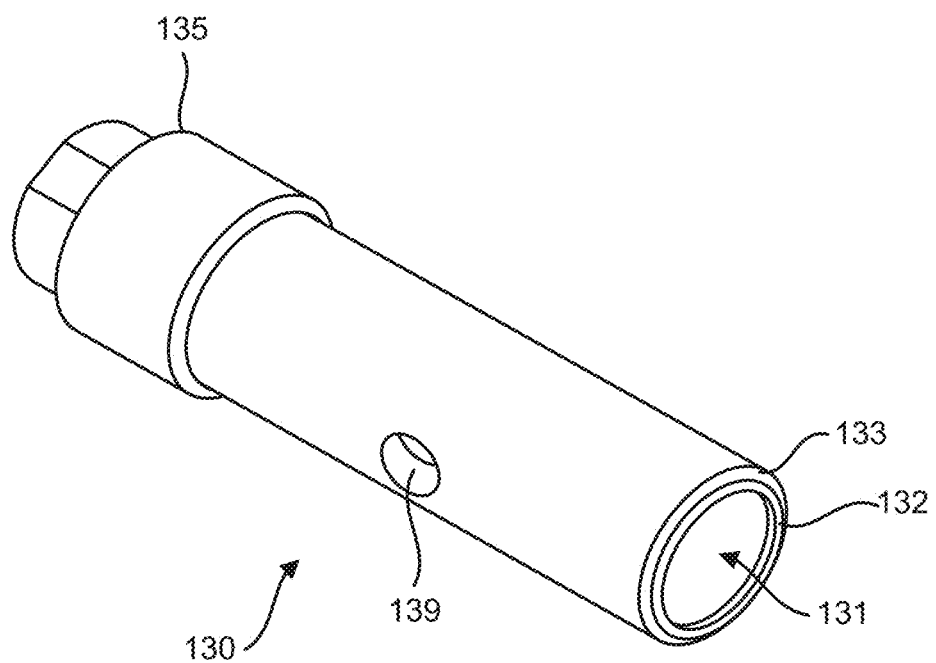
FIG. 5A illustrates a perspective view of a sleeve and a bushing, according to an embodiment of the invention.

Referring additionally to FIG. 5A, which shows a perspective view of a sleeve 130 and bushing 132, at the first end 126, the stem 122 is inserted into a sleeve 130 secured to the body 102 in the first portion 110 of the flow passage 104. The sleeve 130 has an elongated body with a hollow portion 131 opening at a first end 133 to receive the stem 122. A sleeve bushing 132 in the hollow portion 131 of the sleeve 130 facilitates sliding movement of the stem 122 in the sleeve 130. At an opposite end 135 of the sleeve 130, an outer diameter of the sleeve 130 tapers across a distance toward the first end 133. An opening 137 through the body 102 of the control valve 102 to the first portion 110 is aligned with the axis 124 of the stem 122. The first end 133 of the sleeve 130 is sized to fit through the opening 137 in the body 102 of the control valve 100, and the opposite end 135 with the tapering diameter is configured to press fit into and seal the opening 137. A position of the first end 133 of the sleeve 130 is secured and held in position by a rigidity of the sleeve material and the press-fit of the opposite end 135 in the opening 137. A relief hole 139 between the first end 133 and the opposite end 135 can relieve and/or prevent positive and/or negative pressure change in the hollow portion 131 as the sleeve 130 slides therein.

At the second end 128, the sleeve 122 is inserted through a bearing 134 and a receptacle 136 of a top cover 138 of a bonnet 140. The bearing 134 facilitates sliding of the stem 122 at the second end 128 of the stem 122. The stem 122 is biased toward the closed position by a spring 142 positioned around the stem 122 between the top cover 138 and the valve seal 116.

The top cover 138 is attached to the bonnet 140, which is attached to the body 102 of the control valve 100 to cover an opening 144 (see FIG. 6) through the body 102 into the second portion 112 of the flow passage 104. The top cover 138 has a plug 146 to plug an end of the receptacle 136. The plug 146 can be removed to access the receptacle 136, the stem 122, and the bearing 134. The top cover 138 cover can be removed from the bonnet 140 to access an interior space 148 between the bonnet 140 and the second portion 112 of the flow passage 140, and to access the spring 142. A diaphragm 150 is compressed between the bonnet 140 and a flange 152 around the opening 144 (see FIG. 6) in order to seal fluid from entering the interior space 148 from the second portion 112 of the flow passage 104. The diaphragm 150 is secured and/or compressed between the valve seal 116 and a plate 154, such that the diaphragm 150 can move and/or stretch to move with the valve seal. An o-ring 156 seals between the stem 122 and the valve seal 116, completing the seal of fluid from flowing into the interior space 148 from the second portion 112 of the flow passage 104.

The shape of the valve body 102 and flow passage 104 further increase the fluid flow rate capacity. The first portion 110 of the flow passage 104 has a first axis 160 centered through the inlet 106. From the inlet 106, nearing the junction 118, the first portion 110 has a bend 162 that turns to intersect the second portion 112 at an angle of approximately 90 degrees. The first portion 110 accordingly has a second axis 164 centered through the junction 118, the valve seat 120, the valve seal 116, the stem 122, and/or the opening 144 (see FIG. 6). The first axis 160 is angled obliquely relative to the second axis 164. In some embodiments, a first oblique angle 166 between the first axis 160 and the second axis 164 can range between 15 and 75 degrees. In some embodiments, the first oblique angle 166 can range between 45 and 65 degrees. In some embodiments, the first oblique angle 166 can range between 50 and 60 degrees. In some embodiments, the first oblique angle 166 can be approximately 55 degrees. The first oblique angle 166 being in these ranges, and particularly being approximately 55 degrees, combined with the shape of the flow channel, facilitates maximum flow rate capacity.

Because a plane 168 of the valve seat 120 and junction 118 is perpendicular to the second axis 164, the plane 168 can be angled obliquely relative to the first axis 160. This second oblique angle 169 can be between 15 and 75 degrees from parallel with the first axis 160, between 25 and 45 degrees in some embodiments, between 30 and 40 degrees in some embodiments, or approximately 35 degrees in some embodiments.

The second portion 112 of the flow passage 104 has a third axis 170 centered through the outlet 108. In the illustrated embodiment, the third axis 170 is collinear with the first axis 160, though in some embodiments, the third axis 170 can be parallel but not collinear with the first axis 160, and in some embodiments, the third axis 170 is not parallel with the first axis 160. From the outlet 108, nearing the junction 118, the second portion 112 has a bend 172, after which the second portion 112 continues straight past the stem 122 and valve seal 116 to an end 173 opposite the outlet 108. The second portion 112 accordingly has a fourth axis 174, which is angled obliquely relative to the third axis 170, and which is approximately perpendicular to the second axis 164. In some embodiments, this third oblique angle 176 can range between 15 and 75 degrees. In some embodiments, the third oblique angle 176 can range between 25 and 45 degrees. In some embodiments, the third oblique angle 176 can range between 30 and 40 degrees. In some embodiments, the third oblique angle 176 can be approximately 35 degrees.

As a result of this angular structure of the flow passage 104, the total directional change of fluid as it flows from the inlet 106 through the first portion 110 to the second portion 112 and out the outlet 108 is decreased with respect to conventional control valves, which decreases turbulence and increases the flow rate capacity. How much the directional change of the flow passage 104 can be reduced is limited by the structural components necessary to operate the valve seal 116 in the flow passage 104 and the desire to output fluid on the same axis as fluid enters the flow passage 104.

Figure 6:
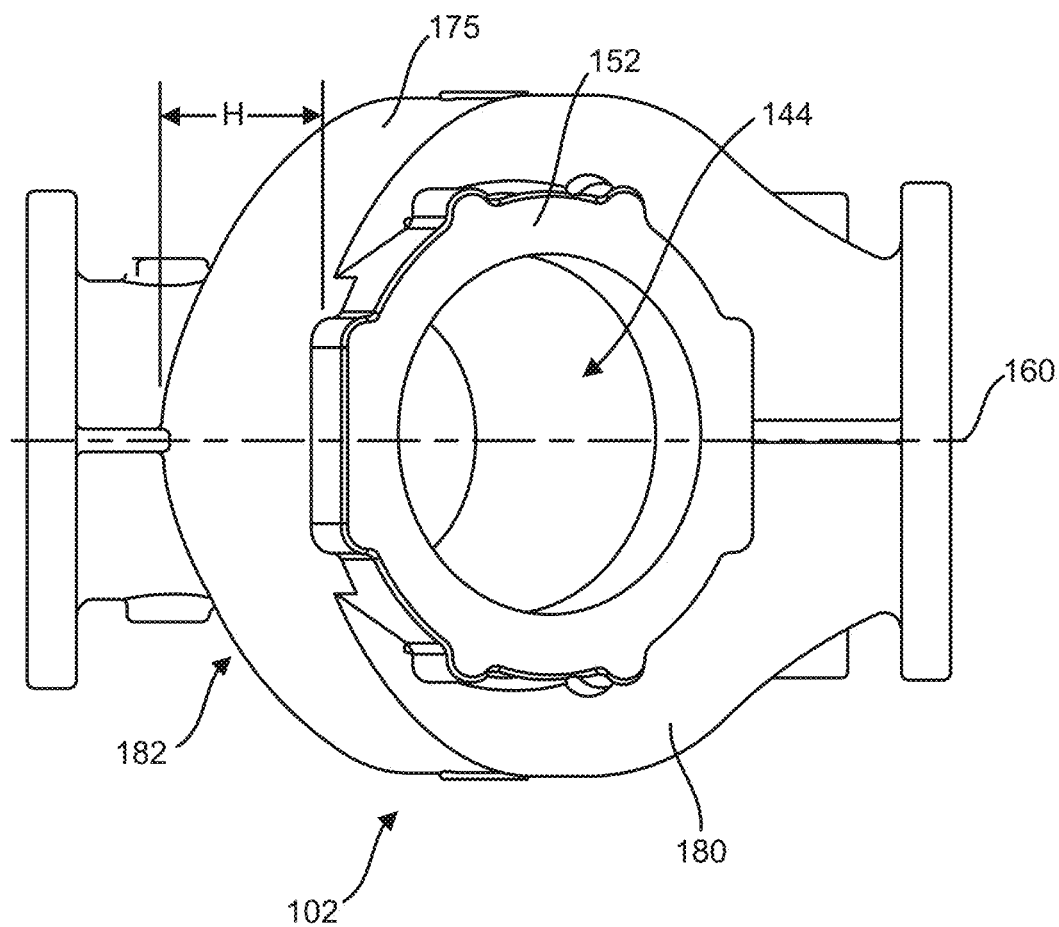
FIG. 6 illustrates a top view of a valve body of the control valve of FIG. 3.
Figure 7:
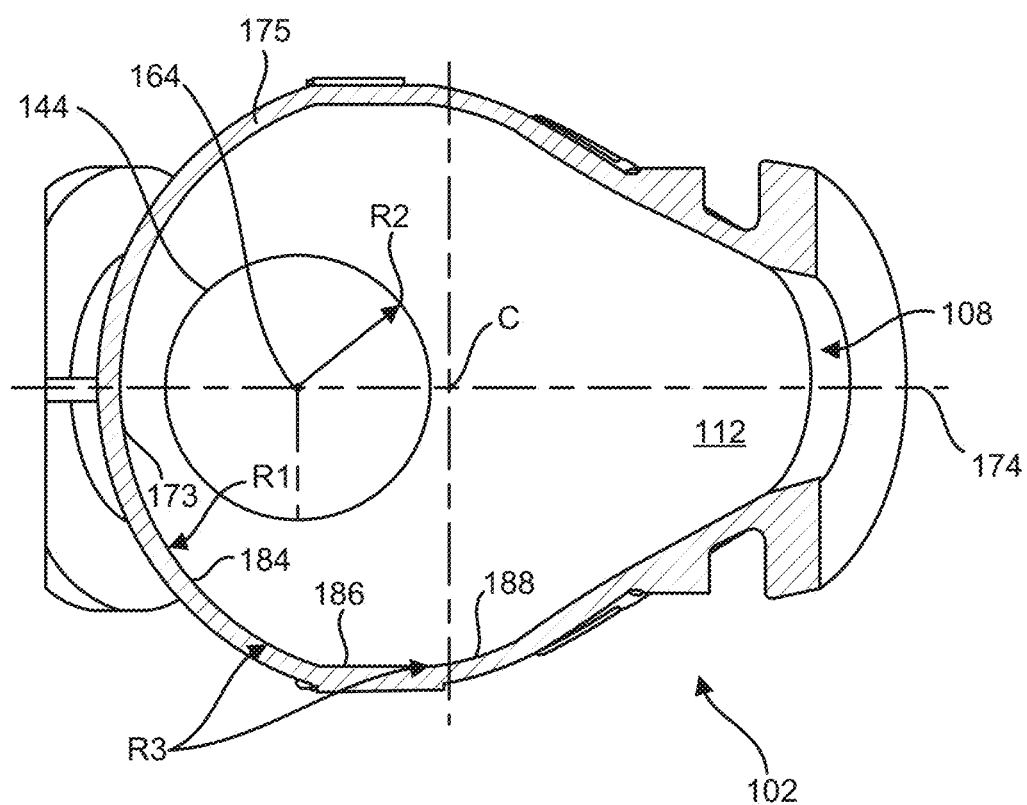
FIG. 7 illustrates a cross sectional view of the valve body of FIG. 6.

The structure and shape of the second portion 112 around the stem 122 and the valve seal 116 further facilitates flow toward the outlet 108 to further decrease turbulence and improve the flow rate capacity of the control valve 100. FIG. 6 illustrates a top view of the valve body 102, looking perpendicularly toward the first axis 160. FIG. 7 illustrates a cross sectional view of the valve body 102 looking perpendicularly toward the fourth axis 174. Referring to FIG. 6 and FIG. 7, in addition to FIGS. 3-5, the second portion 112 is expanded around the second axis 164 and the opening 144, as compared to the size of the outlet 108. More specifically, the second portion 112 opens from a cylindrical shape at the outlet 108 to a three-dimensional, irregular disk shape around the second axis 164 and the opening 144. The three-dimensional disk shape has a flat first side 180, a flat second side 182 opposite the first side 180, and a height H. The end 173 of the second portion 112 has a curved wall 184 with a radius R1 and a center C. The second axis 164 and the opening 144 are offset from the center C toward the end 173 of the second portion 112 opposite the outlet 108, such that a portion of the flange 152 around and adjacent the opening 144 is continuous with a curved wall 184 of the end 173, or such that the flange 152 covers the first side 180 between the opening 144 and the end 173. In other words, there is minimal space between the opening 144 and the end 173 of the second portion 112 only sufficient to make room for the flange 152. In some embodiments, the flange 152 can be eliminated such that the curved wall 184 at the end 173 are coplanar. Because of the resulting close proximity of the second axis 164 and the opening 144 to the end 173 of the second portion 112, as fluid flows into the second portion 112 from the first portion 110, the fluid has relatively little space to flow "backwards", and the fluid is instead expeditiously forced to move toward the outlet 108.

Further, a wall 175 of the body 102 at the end 173 of the second portion 112 between the first side 180 and the second side 182 is essentially flat and/or straight across the height H from the first side 180 to the second side 182, to further limit the flow "backwards" or "sideways", and to instead force fluid to expeditiously flow toward the outlet 108. The only curvature of the wall 175 moving along the span of the height H at the end 173 can be the roundedness of rounded corners 177 at a union of the wall 175 and the first side 180 or at a union of the wall 175 and the second side 182. "Essentially straight" or "essentially flat" is intended to mean that the wall is straight excluding any relatively small roundedness at the union of the wall 175 with the first side 180 or the second side 182. The wall 175, extending laterally past and around the axis 164 to the outlet 108, can be essentially flat and/or straight in this manner across the height H.

Further, the offset of the opening 144 and the axis 164 toward the end 173, along with the radius R1 being greater than a radius R2 of the opening 144 results in an expansion of a volume of the second portion 112 between the body 102 and the second axis 164 laterally around the second axis 164, and from the end 173, toward the outlet 108, thereby drawing the fluid forward of the axis 164 before the volume decreases to the outlet 108. In the illustrated embodiment, the end 173 has a relatively large radius R1 of 190.5 mm (7.5 inches), which transitions to a radius R3 of 76.2 mm (3.0 inches), and then a first straight edge 186 parallel with the fourth axis 174. A second straight edge 188 bends 15 degrees inward from the first edge 186 to begin tapering to the diameter D of the outlet 108. The quick expansion from the end 173 to a point between the second axis 164 and the outlet 108 further draws fluid toward the outlet, to increase flow rate capacity.

The length of the second portion is minimized by positioning the bend 172 of the second portion 112 directly adjacent the flange 152, thereby minimizing or reducing flow distance.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A control valve comprising:
   a body having a flow passage therethrough, the flow passage having an inlet, an outlet, a first portion, and a second portion, the first portion having a first axis centered through the inlet, the second portion having a second axis centered through the outlet, a flat first side, a flat second side, and a wall extending from the flat first side to the flat second side, the first axis parallel with the second axis, the flat first side and the flat second side being at least partially external to the flow passage;
   a valve seat positioned at a junction between the first portion and the second portion, the first portion being to an upstream side of the valve seat and the second portion being to a downstream side of the valve seat, the valve seat having an opening therethrough, the opening extending through the flat second side;
   a stem with a third axis oriented to intersect with the opening; and
   a seal attached to the stem, the stem configured to move axially to move the seal between a closed position, where the seal fills the opening, and an open position, where the seal is distal from the valve seat.

2. The control valve of claim 1, wherein the second portion includes a bend and a fourth axis, the fourth axis angled obliquely relative to the second axis.

3. The control valve of claim 2, wherein the fourth axis is angled between 25 and 45 degrees relative to the second axis.

4. The control valve of claim 2, wherein the fourth axis is angled between 30 and 40 degrees relative to the second axis.

5. The control valve of claim 2, wherein the third axis is perpendicular to the fourth axis.

6. The control valve of claim 1, wherein the first portion includes a bend and a fourth axis, the fourth axis centered through the junction, the fourth axis angled obliquely relative to the first axis.

7. The control valve of claim 6, wherein the fourth axis is angled between 45 and 65 degrees relative to the first axis.

8. The control valve of claim 6, wherein the fourth axis is angled between 50 and 60 degrees relative to the first axis.

9. The control valve of claim 6, wherein the third axis is aligned with the fourth axis.

10. The control valve of claim 1, wherein a plane of the valve seat is angled between 25 and 45 degrees from parallel with the first axis.

11. The control valve of claim 1, wherein a plane of the valve seat is angled between 30 and 40 degrees from parallel with the first axis.

12. The control valve of claim 1, wherein the first portion includes a first bend adjacent the junction, and the second portion includes a second bend adjacent the junction, such that the first portion intersects the second portion at approximately 90 degrees.

13. The control valve of claim 2, wherein a volume of the second portion between the body and the third axis expands from an end of the second portion opposite the outlet around the third axis toward the outlet, beyond a plane containing the third axis and being perpendicular to the fourth axis, and then decreases to the outlet.

14. The control valve of claim 1, wherein the first axis is colinear with the second axis.

15. The control valve body of claim 1, further comprising:
   a flange around the first opening; and
   a bonnet mounted on the flange and covering the first opening.

16. A control valve body comprising:
   a flow passage having an inlet, an outlet, a first portion, a second portion, and a junction of the first portion with the second portion, the first portion being to an upstream side of the junction, the first portion having a first axis, a first bend, and a second axis, the second portion being to a downstream side of the junction, the second portion having a third axis, a second bend, a fourth axis, a flat first side, a flat second side, and a wall extending essentially straight from the first side to the second side; and
   a first opening to the second portion, the first opening extending through the flat first side and having a fifth axis,
   a second opening to the second portion, the second opening extending through the flat second side and the junction, the second opening having a sixth axis,
   the first axis being centered through the inlet, the second axis centered through the junction, the third axis centered through the outlet, the fourth axis perpendicular to the second axis, and the fifth axis and the sixth axis aligned with the second axis;
   the flat first side and the flat second side being at least partially external to the flow passage.

17. The control valve body of claim 16, wherein the first axis is parallel with the third axis.

18. The control valve body of claim 16, wherein the second axis is angled obliquely relative to the first axis, and the fourth axis angled obliquely relative to the third axis.

19. The control valve body of claim 16, wherein the fourth axis is angled between 25 and 45 degrees relative to the third axis.

20. The control valve body of claim 16, wherein the fourth axis is angled between 30 and 40 degrees relative to the third axis.

21. The control valve body of claim 16, wherein the second axis is angled between 45 and 65 degrees relative to the first axis.

22. The control valve body of claim 16, wherein the second axis is angled between 50 and 60 degrees relative to the first axis.

23. The control valve body of claim 16, wherein the first portion intersects the second portion at approximately 90 degrees.

24. The control valve body of claim 16, wherein a volume of the second portion between the body and the second axis expands from the end of the second portion opposite the outlet around the second axis toward the outlet, beyond a plane containing the second axis and being perpendicular to the fourth axis, and then decreases to the outlet.

25. The control valve body of claim 16, further comprising:
   a flange around the first opening; and
   a bonnet mounted on the flange and covering the first opening.

\* \* \* \* \*